United States Patent [19]
Loveless

[11] Patent Number: 6,161,011
[45] Date of Patent: Dec. 12, 2000

[54] HYBRID FIBER COAX COMMUNICATIONS SYSTEMS

[75] Inventor: Robert C. Loveless, Lawrenceville, Ga.

[73] Assignee: Scientific-Atlanta, Inc., Norcross, Ga.

[21] Appl. No.: 08/941,594

[22] Filed: Sep. 30, 1997

Related U.S. Application Data

[63] Continuation of application No. 08/493,542, Jun. 22, 1995, abandoned.

[51] Int. Cl.$^7$ ..................................................... H04Q 7/22
[52] U.S. Cl. .......................... 455/426; 455/467; 455/560
[58] Field of Search ................................ 455/1, 3.1, 6.1; 379/207; 370/486, 522, 490; 356/73.1; 359/110, 124, 125, 118

[56] References Cited

U.S. PATENT DOCUMENTS

| | | | |
|---|---|---|---|
| 4,768,188 | 8/1988 | Barnhart et al. | 370/80 |
| 5,014,125 | 5/1991 | Pocock et al. | 358/86 |
| 5,329,308 | 7/1994 | Binns et al. | 455/3.1 X |
| 5,469,495 | 11/1995 | Beveredge | 379/56 |
| 5,483,369 | 1/1996 | Darcie et al. | 359/126 |
| 5,499,241 | 3/1996 | Thompson et al. | 370/73 |
| 5,574,778 | 11/1996 | Ely et al. | 379/207 |
| 5,640,196 | 6/1997 | Behrens et al. | 455/3.1 X |
| 5,809,395 | 9/1998 | Hamilton-Piercy et al. | 455/4.1 |

FOREIGN PATENT DOCUMENTS 0 421 602 A2  8/1990  United Kingdom ................... 379/56.2

OTHER PUBLICATIONS

M. Pezarro et al., "Project Case: A Cable Architecture for the 90s", pp. 124–129.

R.C. Loveless, "Fiber to the Feeder A 'Star' Architecture", SCTE Fiber Optics Meeting, Jan. 1991, pp. 1–7.

R.C. Loveless et al., "A Fiber Optic Design Study", NCTA Technical Papers, May 21–24, 1989, pp. 114–118.

J.A. Mattson, "Fiber to Feeder Design Study", NCTA Technical Papers, 1991, pp. 309–319.

C.J. McGrath, "The Evolution of CATV Broadband Hybrid Networks", NCTA Technical Papers, May 3–6, 1992, pp. 124–128.

C. Eldering et al., "Engineering Requirements for Hybrid Fiver—Coax Telephony Systems", NCTA Technical Papers, May 22–25, 1994, pp. 219–231.

Primary Examiner—Krista Zele
Assistant Examiner—Robert Louis Sax
Attorney, Agent, or Firm—Kelly A. Gardner; Kenneth M. Massaroni; Hubert J. Barnhardt, III

[57] ABSTRACT

A communications system includes first and second fiber optic links, each including at least one fiber optic cable, and a coaxial distribution plant including coaxial distribution lines and a plurality of amplifiers. A first fiber optic node couples the first fiber optic link to the coaxial distribution plant and a second fiber optic node located proximate to one of the amplifiers of the coaxial distribution plant couples the second fiber optic link to the coaxial distribution plant.

25 Claims, 11 Drawing Sheets

HYBRID FIBER COAX COMMUNICATIONS SYSTEMS

This application is a continuation of application Ser. No. 08/493,542 filed Jun. 22, 1995, now abandoned.

BACKGROUND OF THE INVENTION

1. Technical Field

The present invention generally relates to communications systems and, more specifically, to an architecture for communications systems which include fiber optic and coaxial distribution lines.

2. Description of Related Art

In the past, broadband coaxial cable television systems have been designed with a system architecture known as "trunk and feeder." The function of a trunk coaxial cable is to deliver broadband television signals from a reception center, or headend, to a plurality of distribution points. The distribution points are connected to feeder coaxial cables which emanate from the trunk coaxial cable and contain subscriber tap off devices. At the distribution points, the feeders connect to the trunk at locations commonly termed trunk/bridger stations. These bridger locations (along with the headend and any hubs) are generally known as "star" focal points with the feeder cables emanating in all directions therefrom.

In recent years, there has been a great deal of interest in the transmission of various types of information including, for example, television signals, via optical fibers. Optical fibers intrinsically have more information carrying capacity than do the coaxial cables which are used in present cable television systems. In addition, optical fibers are subject to less signal attenuation per unit length than are coaxial cables adapted for carrying radio frequency signals. Consequently, optical fibers are capable of spanning longer distances between signal regenerators or amplifiers than are coaxial cables. In addition, the dielectric nature of optical fiber eliminates the possibility of signal outages caused by electrical shorting or radio frequency pick-up. Finally, optical fiber is immune to ambient electromagnetic interference ("EMI") and generates no EMI of its own.

It would therefore be desirable to provide an optical fiber cable to the home of each subscriber in a cable television system. Such a fiber-to-the-home (FTTH) architecture provides the above-identified advantages of using fiber as well as providing sufficient bandwidth to each customer for anticipated data services. However, the costs of such an arrangement are currently prohibitive.

Figure 1:
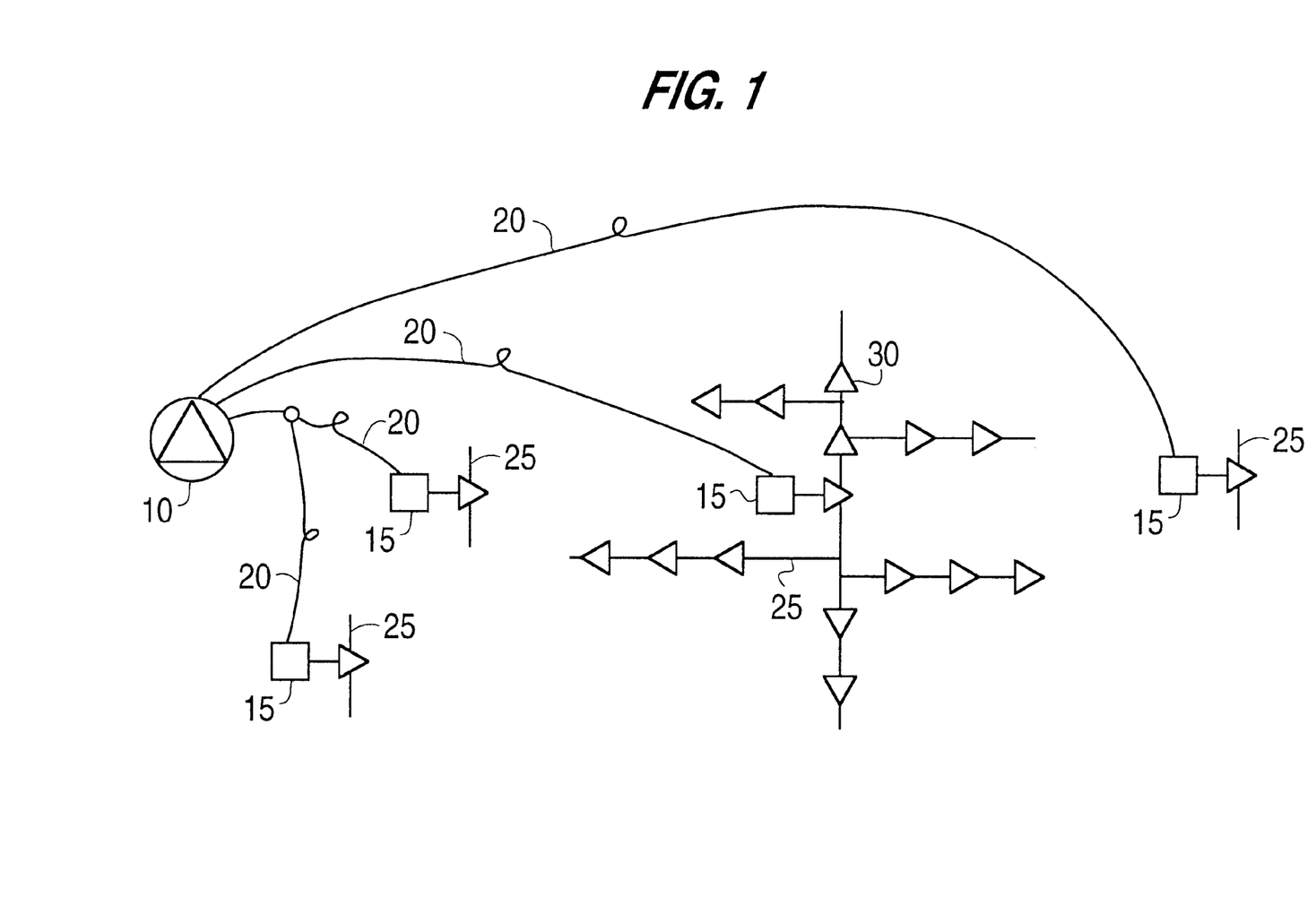
FIG. 1 illustrates a conventional fiber-to-feeder (FTF) communications system.

Optical fibers have been implemented in various architectures. One such architecture is generally shown in FIG. 1 and is known as a fiber-to-feeder (FTF) system. In its simplest form, an FTF system replaces the coaxial trunk system with optical fiber to what was a bridger location. Thus, in the FTF system of FIG. 1, a headend 10 is coupled to a plurality of fiber optic nodes 15 via optical fibers 20. Fiber optic nodes 15 each include a transducer for transducing the received optical signals to corresponding RF signals which are output to a conventional coaxial plant which includes coaxial distribution lines 25 and a plurality of RF amplifiers 30.

Figure 2:
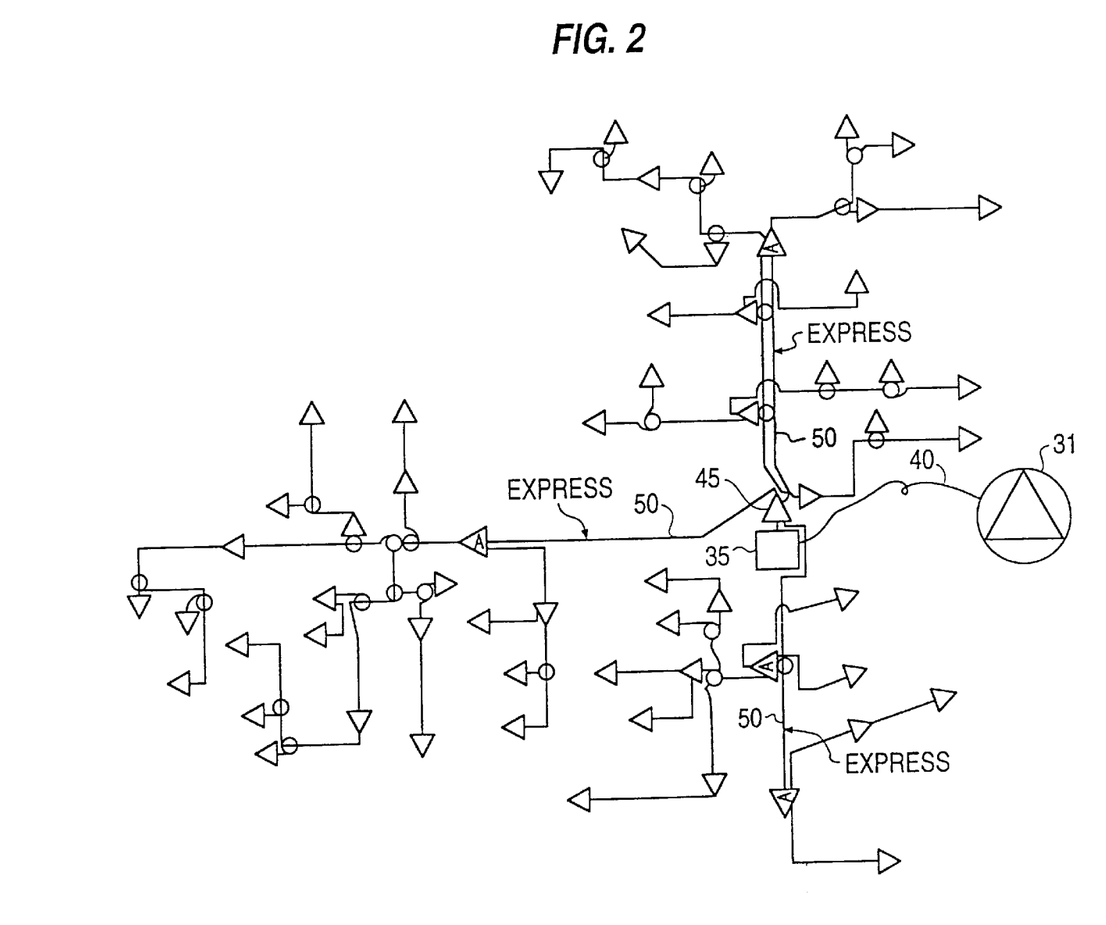
FIG. 2 illustrates a conventional fiber-to-serving area (FSA) communications system.

To provide higher levels of service and performance to subscribers on a pocket by pocket approach, a fiber-to-serving-area (FSA) system such as generally shown in FIG. 2 may be utilized. In the FSA system, the coaxial trunk is replaced with a fiber optic supertrunk. At the fiber optic receive node, a high-output distribution amplifier is installed for feeding three or more express feeder cables extending further into the serving area. Signal distribution continues from there using distribution amplifiers in a normal feeder design. Thus, in the system of FIG. 2, a headend 31 is coupled to a fiber optic receive node 35 via a fiber optic cable 40. The output of fiber optic node 35 is supplied to a distribution amplifier 45. The output of distribution amplifier 45 is supplied to express feeder runs 50. These express feeder runs extend the reach of the amplifier cascades. Thus, as shown in FIG. 2, the serving area is further subdivided into mini-serving areas, each of which is fed by an express feeder.

Figure 3:
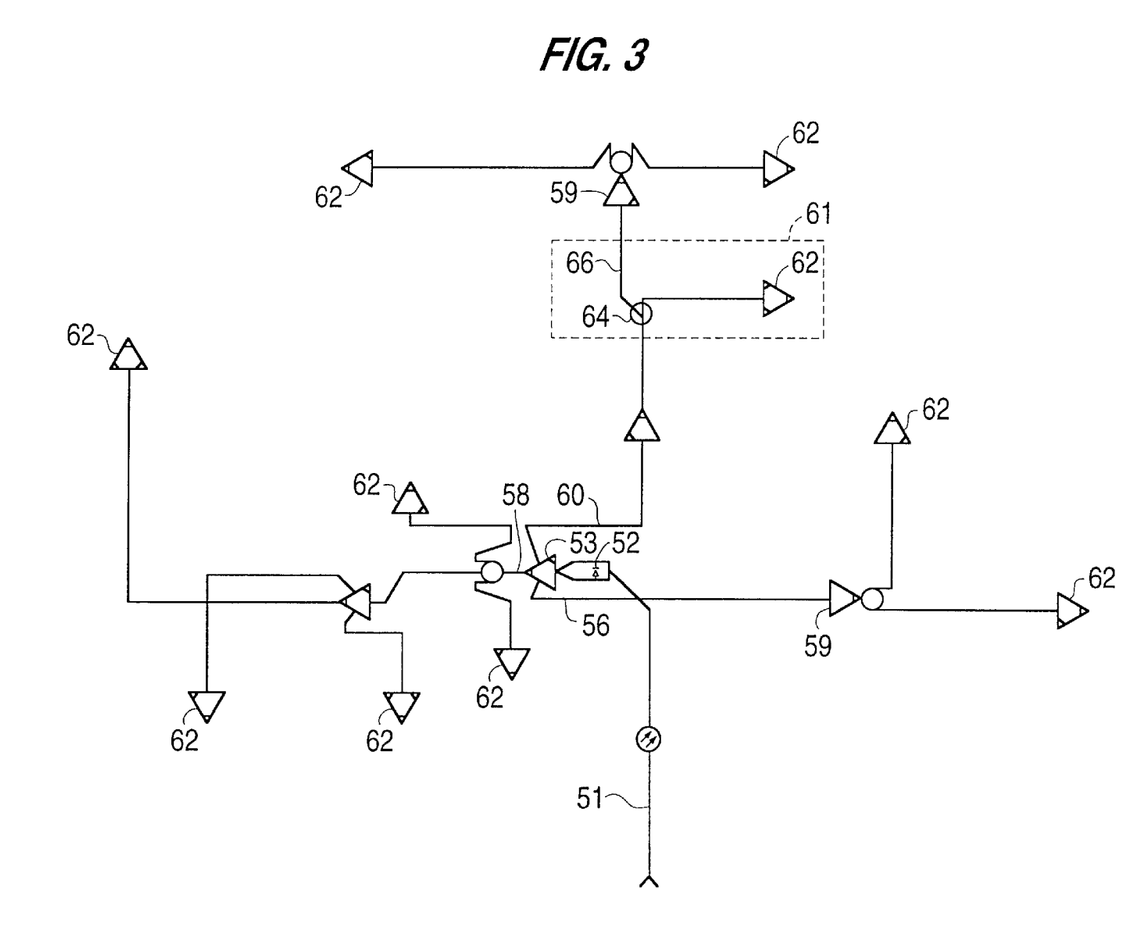
FIG. 3 illustrates a portion of one implementation of an FSA communications system.

A portion of an FSA system implemented by Scientific-Atlanta, Inc. of Norcross, Georgia is illustrated in FIG. 3. The system of FIG. 3 is a two-way communications system having a forward path with an RF frequency range of 54–750 megahertz (MHz) and a return path with an RF frequency range of 5–40 MHz. The forward path RF signals are transduced to optical signals at a headend (not shown) and transmitted over a fiber optic link 51 to a fiber optic node 52. Fiber optic node 52 passes approximately 500 homes. The optical signals received at fiber optic node 52 are transduced back to RF signals in a frequency range of 54–750 megahertz for distribution over a coaxial distribution plant. The output of fiber optic node 52 is supplied to a launch amplifier 53 which outputs signals to express feeders 56, 58, and 60. Express feeders 56, 58, and 60 and tap amplifiers 62 form part of the coaxial distribution plant. Other amplifiers such as express (or transport) amplifiers 59 for amplifying signals on the express feeders also form part of the coaxial distribution plant. Amplifiers 59 and 62 amplify both forward and return path signals over the coaxial distribution plant. Reference may be made, for example, to commonly assigned U.S. application Ser. No. 08/304,171, which is incorporated herein by reference, for a general description of diplex filter amplifiers which amplify both forward and return path signals. The return path signals from subscriber homes are supplied to fiber optic node 52 via the coaxial distribution plant. Fiber optic node 52 includes a reverse path transmitter for transducing the reverse path RF signals to optical signals for transmission to the headend via fiber optic link 51.

Figure 4:
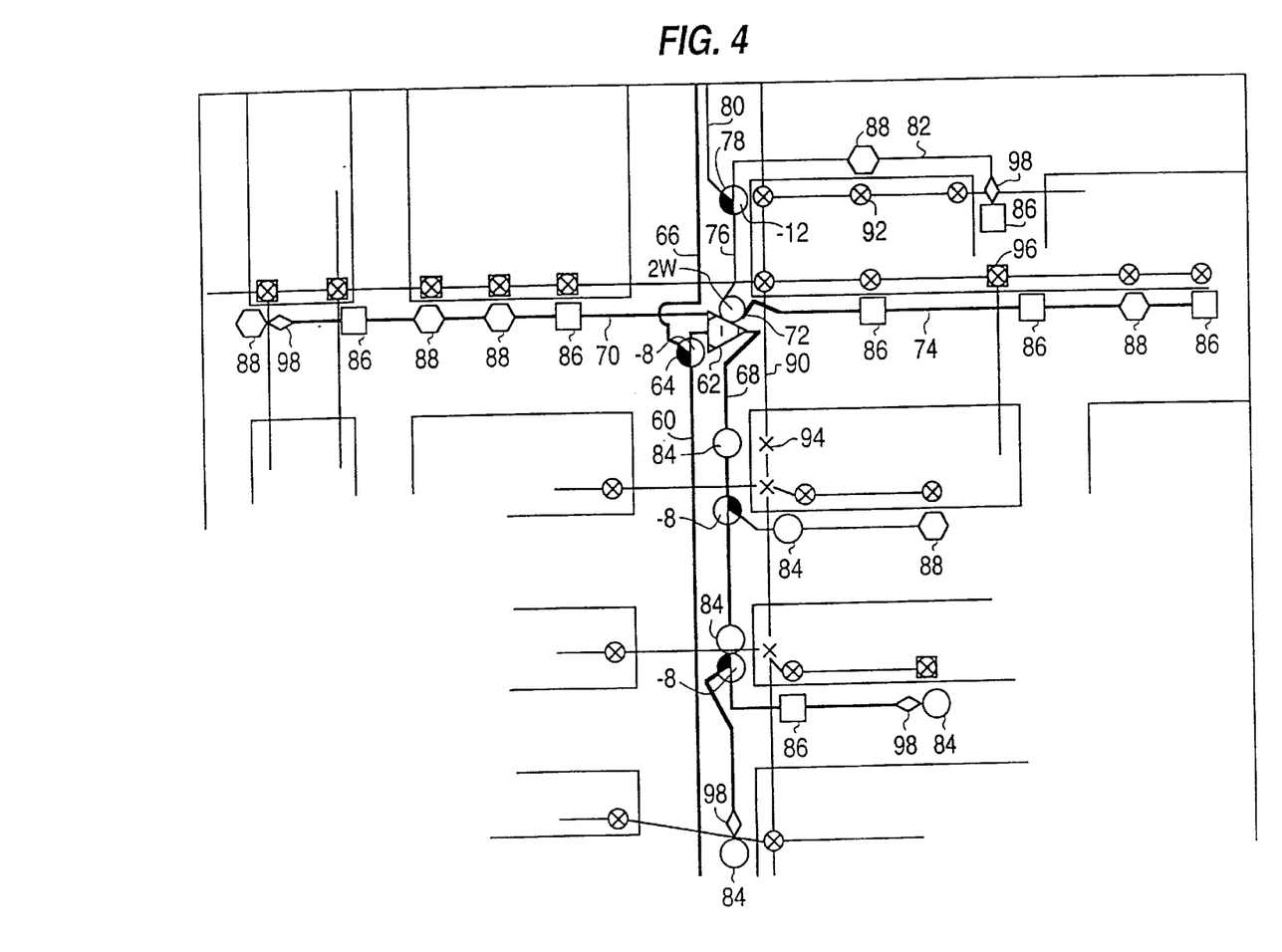
FIG. 4 illustrates a detailed portion of the communications system of FIG. 3.

FIG. 4 is a detailed illustration of the portion of the system of FIG. 3 contained in box 61. Express feeder 60 from fiber optic node 52 and distribution amplifier 53 is coupled to tap amplifier 62 via an 8 dB directional coupler 64. Directional coupler 64 has a first output at which the signal level is reduced by 8 dB and a second output at which the signal level is reduced by 1 dB. The first output of directional coupler 64 is connected to tap amplifier 62 and the second output of directional coupler 64 is connected to a coaxial distribution line 66. Tap amplifier 62 outputs signals to coaxial distribution lines 68 and 70 and to two-way splitter 72. Splitter 72 divides the input signal into two equal parts which are supplied to coaxial distribution lines 74 and 76. Coaxial distribution line 76 feeds a 12 dB directional coupler 78 which couples a first portion of the signal supplied thereto to a coaxial distribution line 80 and a second portion of the signal supplied thereto to a distribution line 82. Various taps 84, 86, and 88 tap off a percentage of the broadband RF signal power on a corresponding coaxial distribution line to distribute to the subscribers' homes (not shown). Taps 84 may, for example, be two-way taps such as a Model SAT2F available from Scientific-Atlanta, Inc. Taps 86 may, for example, be four-way taps such as a Model SAT4F available from Scientific-Atlanta, Inc. Taps 88 may, for example, be eight way taps such as a Model SAT8F available from Scientific-Atlanta, Inc. Power is supplied to the distribution equipment via power lines 90 connected to telephone poles 92, power line poles 94, and transformers 96. Equalizers 98 may also be provided to equalize signal levels at various points in the distribution system.

Attempts are currently being made to migrate these and other hybrid fiber-coax (HFC) system architectures to architectures which push optical fiber deeper and deeper into the system, i.e., closer to the homes in the system. One attempt at migration from current HFC systems is a 1 gigahertz (GHz) fiber transmission system which was developed for use in a full service network in Orlando, Florida. Although this system provides for a return path from 900 MHz to 1 GHz, a guard band is needed from 735 MHz to 900 MHz to allow for reverse path signal amplification. This guard band actually reduces the available downstream bandwidth. Additionally, in this system, the performance of embedded drop cables must be sufficient to minimize a return path obstacle to interactive set-top terminals operating at low signal levels in the 900 MHz to 1 GHz band.

Figure 5:
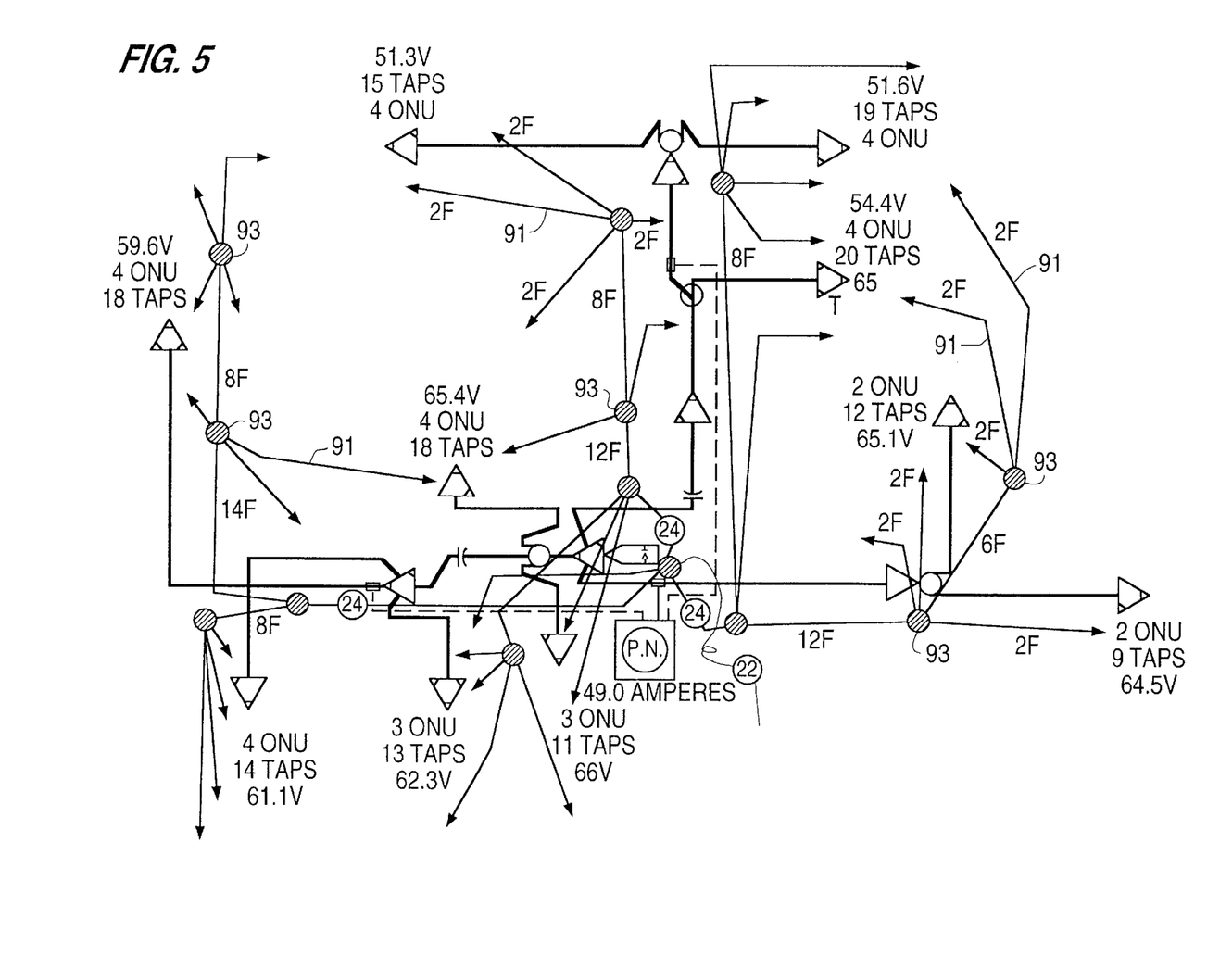
FIG. 5 illustrates a fiber-to-the curb (FTTC) communications system.

A so-called fiber-to-the curb (FTRC) architecture is shown in FIG. 5. It can be seen that while such an architecture pushes fiber optics deeper into the system, it requires a large number of optical fibers 91, fiber splice enclosures 93, and optical network units (ONUs) at the end of each optical fiber. Thus, this design results in significantly higher infrastructure costs.

Accordingly, there remains a need for a phased evolution of existing HFC systems which pushes optical fibers deeper into the communications system and which provides additional two-way bandwidth at relatively low cost.

SUMMARY OF THE INVENTION

In accordance with the present invention, a communications system includes first and second fiber optic links, each including at least one fiber optic cable, and a coaxial distribution plant including coaxial distribution lines and a plurality of amplifiers. A first fiber optic node couples the first fiber optic link to the coaxial distribution plant and a second fiber optic node located proximate to one of the amplifiers of the coaxial distribution plant couples the second fiber optic link to the coaxial distribution plant.

The communications system of the present invention provides a foundation for the eventual evolution of the local loop or nodal area to a more fiber rich architecture and allows a multi-system operator or a local exchange carrier telephone company to immediately implement a passive cable network footprint, which limits the number of amplifiers, while simultaneously containing fiber optic costs. As the local loop or nodal area evolves, no plant re-engineering or re-design is required.

The evolution of present fiber optic system architectures toward fiber-to-the-home in accordance with the present invention provides an intermediate step to migrate fiber into smaller passive cable networks. These new passive cable networks may range in size from about 24 to about 200 homes passed, allowing a direct fiber-to-the-home architecture to be implemented in the near future for many, dense, multi-living unit applications. New multimedia optical fibers, which serve the passive cable networks, provide additional broadband path for switched, interactive services, while the existing 750 MHz HFC system remains the optimal carrier for all broadcast services. The new multimedia fibers may be implemented in either a passband or a baseband arrangement. At the passive cable network nodes, the interactive broadband signals may utilize either the existing coaxial plant or twisted-pair telephony wires for further distribution.

The migration in accordance with the present invention is fully compatible with the originally deployed HFC equipment, and provides a cost effective upgrade path that can be implemented as service requirements evolve. The passband and baseband arrangements allow the operator to optimize the communication system for a specific application, while maintaining a uniformity of system design and layout.

BRIEF DESCRIPTION OF THE DRAWINGS

These and other features and advantages of the present invention will be better understood from a reading of the following detailed description in conjunction with the accompanying drawings in which.

DETAILED DESCRIPTION

Figure 6:
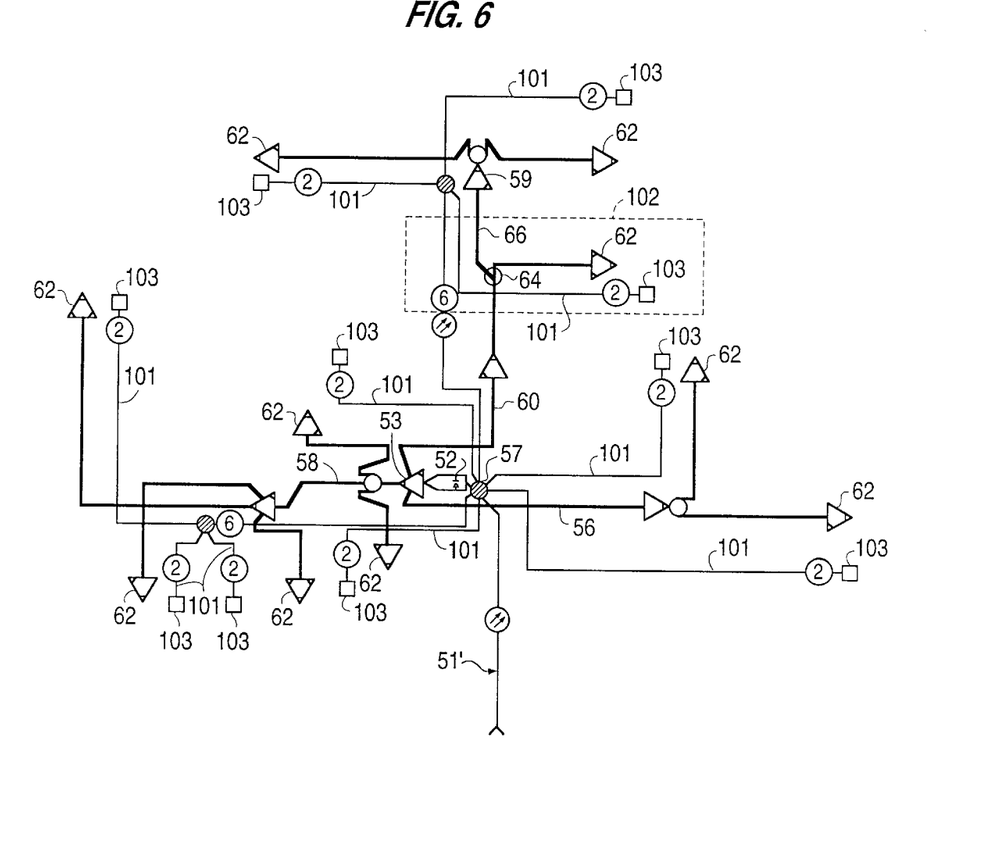
FIG. 6 illustrates a communications system in accordance with the present invention.
Figure 7:
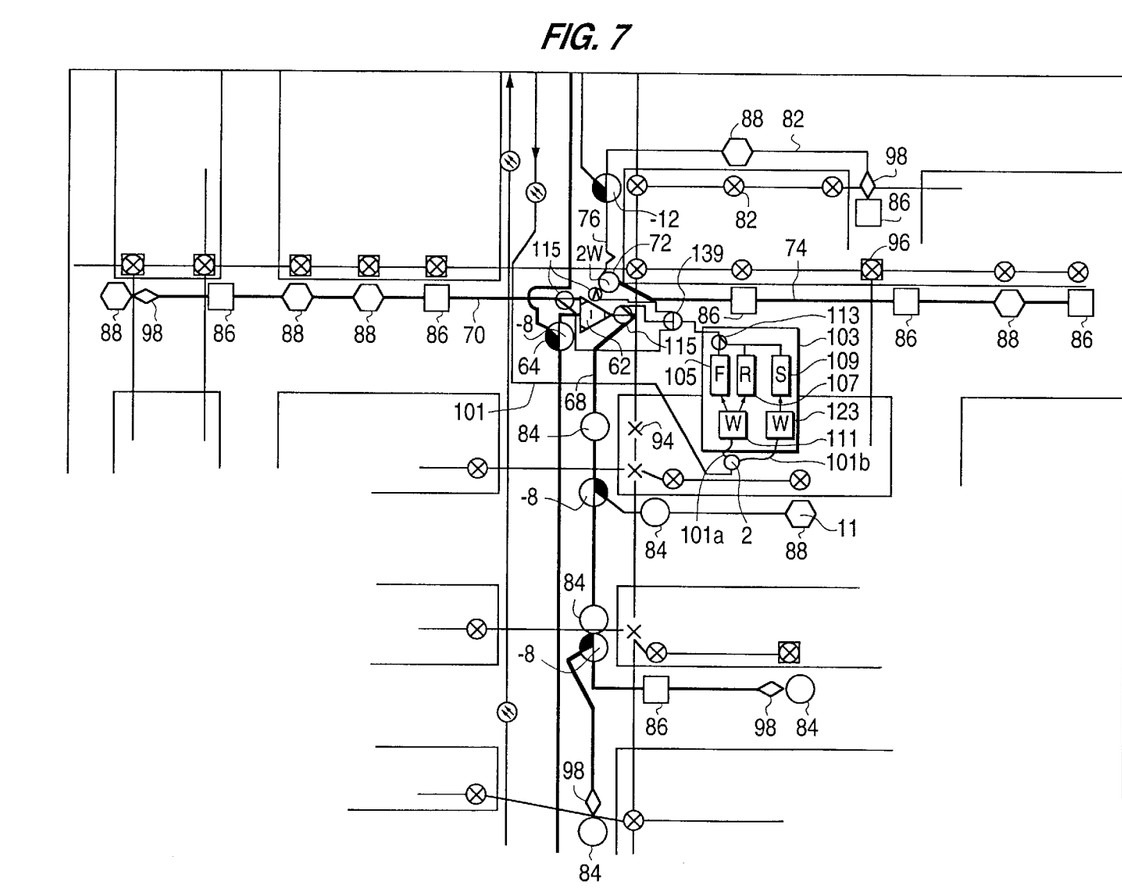
FIG. 7 is a detailed illustration of a portion of the communications system in FIG. 6.

FIGS. 6 and 7 illustrate a portion of a communications system in accordance with the present invention. Elements of the communications system of FIGS. 6 and 7 which are the same as those of the communications system of FIGS. 3 and 4 are designated with the same reference numbers and descriptions thereof are omitted. In accordance with the present invention, a passive cable network node is provided at each tap amplifier to provide a logical segmentation of the 500 home passed optical node. A passive cable network is defined as a serving area having no RF active electronics between a fiber optic node and the last tap. Each passive cable network node generally serves from about 24 to about 200 homes, depending on subscriber density. The original 750 MHz serving area remains intact and serves as the infrastructure for all broadcast services and powering. The 54–750 MHz spectrum may, for example, be dedicated to broadcast analog NTSC video, digital high-definition television (HDTV), impulse pay-per-view, analog and digital near-video-on-demand, and other public broadcast services. The 5–40 MHz return path may, for example, support impulse pay-per-view signaling, status monitoring, and control channels.

Thus, in accordance with the present invention, multimedia optical fibers 101 are coupled to passive cable network nodes 103 provided at each tap amplifier 62. Optical fiber link 51' corresponds to optical fiber link 51 of the system of FIG. 3, but now includes the additional multimedia optical fibers 101. The fibers comprising optical link 51' are fed into a fiber splice enclosure 57. The optical fibers emanating from fiber splice enclosure 57 are connected to fiber optic node 52 and to passive cable network nodes 103. Optical transmitters and receivers are provided at the headend for transmitting and receiving optical signals over optical fiber link 51'. At passive cable network nodes 103, additional carriers are coupled into and out of the coaxial distribution plant. For example, an injected 750–900 MHz downstream carrier may support, for example, digital voice and telephony services, work-at-home services, switched digital video, data and LAN interconnections, PCS transport, bi-directional utility management, as well as the potential for many other new interactive digital services. A 900 MHz–1 GHz tier may be utilized, for example, for switched multimedia return, switched digital video impulse-pay-per-view, and work-at-home-services. A low pass filter circuit is added at each tap amplifier location to contain the multimedia signals to the appropriate passive cable networks as will be discussed below with reference to FIG. 8.

FIG. 7 is a detailed view of the portion of the system of FIG. 6 contained in box 102. As shown in FIG. 7, optical fiber 101 is connected to passive cable network node 103 associated with tap amplifier 62. In the implementation of FIG. 7, optical fiber 101 is a dual optical fiber which includes a first optical fiber 101a and a second optical fiber 101b. Passive cable network node 103 includes forward path circuitry 105, reverse path circuitry 107, digital circuitry 109, wavelength division multiplexers (WDMs) 111 and 123, and a directional coupler 113. Directional couplers 115 couple RF signals between passive cable network node 103, distribution lines 68 and 70, and two-way splitter 72.

Figure 8:
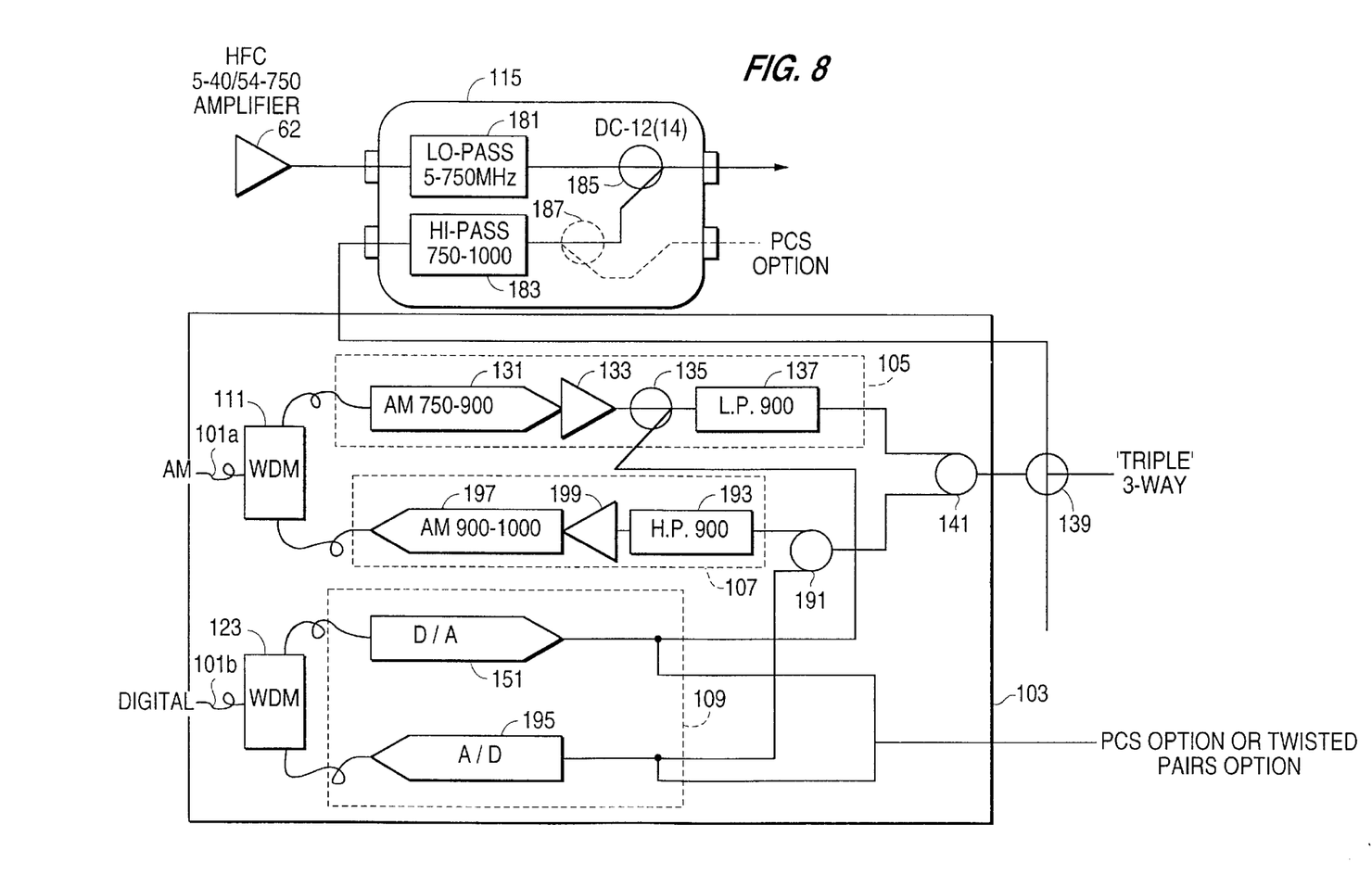
FIG. 8 is a detailed illustration of optical node 103 and directional coupler 115 of FIG. 6.

The details of passive cable network node 103 and directional couplers 115 will now be described with reference to FIG. 8. In accordance with the implementation described herein, fiber 101a includes optical signals which have been amplitude modulated and which are supplied to wavelength division multiplexer 111. Utilization of fiber 101a provides a so-called passband upgrade to the existing HFC communications system. Fiber 101b includes optical signals which have been digitally modulated and which are supplied to wavelength division multiplexer 123. Utilization of fiber 101b provides a so-called baseband upgrade to the existing HFC communications system. Forward path optical signals supplied by fiber 101a are separated by wavelength division multiplexer 111 and supplied to AM optical receiver 131 which transduces the optical signals into RF signals in a first frequency range, for example, 750 to 900 MHz. The RF output of optical receiver 131 is amplified by amplifier 133 and output to directional coupler 135. Forward path optical signals supplied by fiber 101b are separated by wavelength division multiplexer 123 and supplied to optical receiver 151 which transduces the optical signals into RF signals and performs a digital-to-analog conversion. The output of optical receiver 151 is output to directional coupler 135. Directional coupler 135 combines the outputs of amplifier 133 and optical receiver 151. The combined output is filtered by a low pass (900 MHz) filter 137 and supplied to three-way splitter 139 via a combiner/splitter 141. Three-way splitter 139 is connected to the directional couplers 115. One of these directional couplers is shown in detail in FIG. 8. Directional coupler 115 includes a low pass (5–750 MHz) filter circuit 181, a high pass (750–1000 MHz) filter circuit 183, and a directional coupler 185. An optional directional coupler 187 may be provided if personal communication system (PCS) transport services are provided. PCS services involve low-power cellular telephone systems including low-power antenna cells which receive voice transmissions and convert the digital signals to an AM frequency. These antenna cells may be fed directly into one of directional couplers 115 in order to reduce noise ingress and to take advantage of the multimedia optical fibers which have been pushed deeper into the system. It is noted that the PCS signals may alternatively or in addition be fed directly into and out of digital circuitry 109 as shown in FIG. 8. The digital circuitry may also be directly connected to twisted-pair telephony wires. The output from three-way splitter 139 is supplied to high pass filter circuit 183 and then to directional coupler 185 which inserts the downstream carriers from high pass filter circuit 183 into the coaxial distribution plant.

The present invention also utilizes a reverse transmission path over dual fibers 101. Thus, the directional coupler 185 of each of directional couplers 115 also provides reverse path transmissions to high-pass filter circuit 183. These reverse path transmissions are supplied to the optical node 103 via three-way splitter 139. Combiner/splitter 141 provides the reverse path transmissions to splitter 191 which outputs signals to high-pass (900 MHz) filter 193 and a first reverse-path optical transmitter 195. The output of high-pass filter 193 is supplied to a second reverse-path laser transmitter 197 via an amplifier 199. The output of second reverse-path laser transmitter 197 is multiplexed onto optical fiber 101a by wavelength division multiplexer 111. First reverse path optical transmitter 195 performs an analog-to-digital conversion and the output thereof is multiplexed onto optical fiber 101b by wavelength division multiplexer 123.

Figure 9:
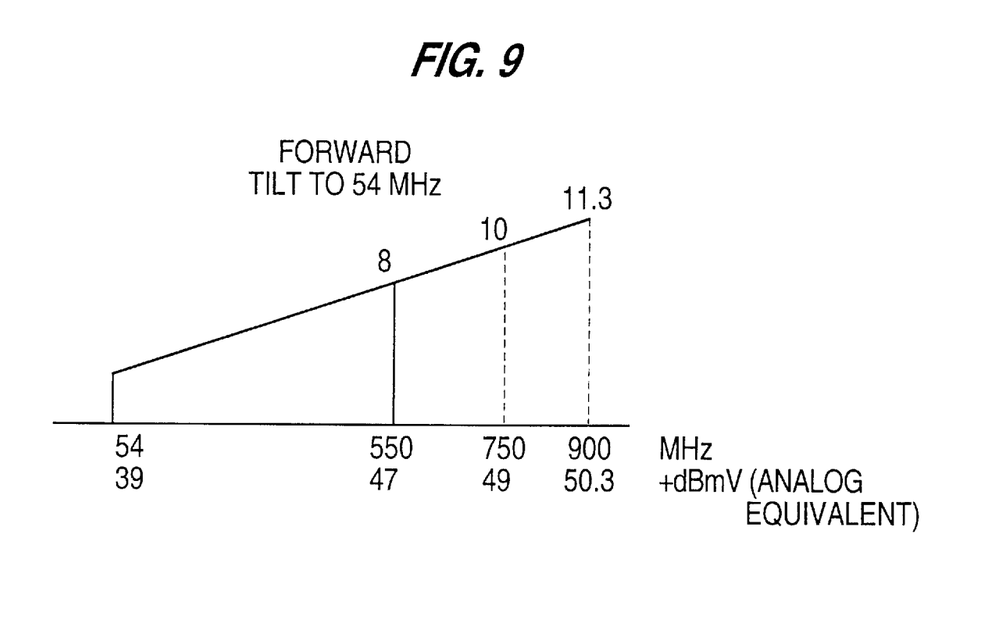
FIG. 9 is a graph illustrating forward tilt in the system of the present invention.

FIG. 9 illustrates the forward tilt of 54–750 megahertz spectrum of the installed HFC network. When carriers in the additional bandwidth from 750–900 megahertz are injected into the coaxial distribution plant, the level of these carriers should be high enough so that it falls in line with the tilted spectrum of the installed HFC network. For example, the output of amplifier 133 may be +77.3 dBmV (Analog equivalency) (27 loss) at 900 MHz to achieve this result. By boosting the signals to fall in line with the tilted output of the basic installed HFC network, it appears to the cable system that the signals are coming from a common device, although, in fact, the signals are coming from two different paths. Thus, the distribution plant may be upgraded without any other changes. Accordingly, the narrow inserted tiers should be operated at output levels which are sufficient so that they may be inserted with the right perspective relative to the other channels.

Figure 10A:
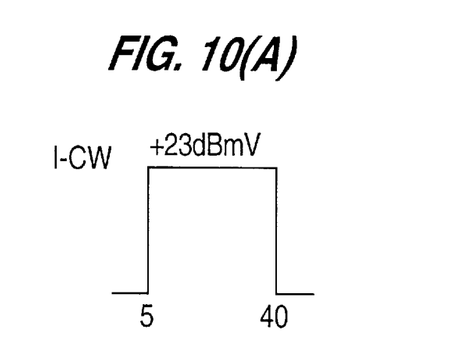
FIGS. 10A and 10B illustrate the signal levels of the 5–40 MHz return path and the 900–1000 MHz return path, respectively.
Figure 10B:
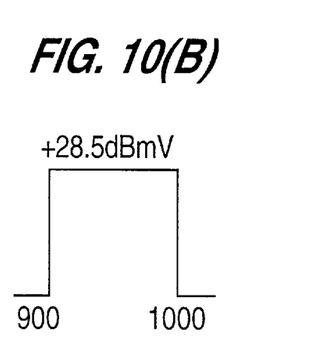

FIGS. 10A and 10B show reverse path signal levels for the 5–40 MHz return path and the 900–1000 MHz return path, respectively.

In accordance with the present invention, two reverse bandwidths are provided and a composite total forward bandwidth is provided between the two reverse bandwidths. This provides the possibility that a failure in one of the forwards paths may be remedied using the other forward path and that a failure in one of the reverse paths may be remedied using the other reverse path.

As an example which illustrates the advantages of the present invention, assume a 500 home-passed optical node of the system of FIG. 3 is partitioned into ten nodes each passing 50 homes by providing passive cable network nodes in accordance with the present invention. It can be seen that an additional downstream bandwidth of 1.5 GHz (i.e., 900–750 MHz=150 MHz×10 nodes=1.5 GHz) and an additional upstream bandwidth of 1 GHz (i.e, 1 GHz–900 MHz=100 MHz×10 nodes=1.0 GHz) is added to the original node. If 64 QAM modulation techniques are used, an incremental digital bandwidth of 6.75 Gb/s downstream and 4.5 Gb/s return is added to the original served optical node. This expanded bandwidth allows a system operator to offer a wide range of broadband services, including multiple DS1, DS3, and FDDI services over the multimedia HFC plant. In addition to expanded bandwidth, the 900 MHz to 1 GHz return path is free from most of the ingress concerns normally appearing in the 5–40 MHz range.

As noted above, the above-described passive network cable nodes at each tap amplifier can be deployed with either or both of two technology arrangements, based upon specific distribution characteristics and application requirements, i.e., the passband arrangement and the baseband arrangement. The passband arrangement is deployed in traditional residential areas as an upgrade to the currently installed full service 750 MHz plant. The baseband arrangement is deployed to address dense cluster applications such as apartments, shopping centers, and small business parks, as well as those areas in which it is desired to provide self-healing service transport over a synchronous optical network (SONET) ring. SONET refers to a transmission protocol which provides interoperability between vendors and networks and facilitates interconnection to the public switched telephone network. SONET defines the physical transport layer for Asynchronous Transfer Mode (ATM) which will become the interoperability standard for wide area network (WAN) and multimedia applications.

The passband type arrangement is generally useful in those residential areas experiencing a dramatic and unexpected growth in interactive work at home and small businesses. Typically, these applications will reflect subscriber densities ranging from 48 to 135 homes passed per mile. Future service requirements are anticipated to fit well within the existing downstream transport (i.e., 54–750 MHz), with the potential incremental demand targeted toward the upstream return path. The passband arrangement allows a system operator the opportunity to upgrade the return path only, the forward path only, or both the forward and return paths. Thus, an operator can allocate the entire additional bandwidth of 750 MHz to 1 GHz to the return path or to the forward path or can allocate portions of the bandwidth to both the forward and return paths.

With the requirement to transmit only the high-band narrow carriers, low cost optical transmitters and receivers may be used for the multimedia passband fiber. These cost savings are achieved because the narrow bandwidth simplifies the design parameters of the circuitry associated with the optical transmitters and receivers. Thus, this choice of technology avoids the excessive costs which would be incurred by migrating the entire 750 MHz broadcast tier to passive cable networks. The passband arrangement uses a wave division multiplexer (WDM) to couple the downstream and upstream transmissions onto a single fiber. At the passive cable network node, AM receiver 131 performs the optical to electrical conversion and inserts the signal into the output of the tap amplifier using directional couplers 115.

The passband arrangement involves only the placement of new optical transmitters and receivers at the central office, and at the passive cable network nodes at each new passive cable network. Thus, the migration is compatible with all deployed network equipment.

The baseband multimedia fiber arrangement is similar in architecture to the passband arrangement, but provides a digital transport of the switched broadband signal to the passive cable networks, rather than the previously described AM signal. The broadcast services remain over the 750 MHz existing hybrid fiber/coax plant. This simple change in the multimedia fiber technology provides a number of different options to a system operator and expands the application range. The new capabilities associated with the digital baseband arrangement include the ability to serve subscribers from a SONET feeder or ring architecture, thus providing an improved service reliability, and an option to utilize the existing copper pairs for either voice and video, or voice only. Typical applications for the baseband arrangement are dense cluster applications such as apartment complexes, business parks and shopping centers where subscribers are more likely to be served over short existing copper twisted-pair telephony wires.

As in the passband arrangement, a passive cable network node is located adjacent to the tap amplifiers, creating the logical passive cable networks. As the operator builds the original 750 MHz HFC infrastructure, the optimized plant design is to shadow the copper distribution plant with the HFC coaxial distribution. The active amplifier should be targeted for placement near copper crossbox distribution points. This provides the operator an option of utilizing the existing copper plant for distribution.

The digital baseband fiber delivers a similar bandwidth to the passive cable network as the passband arrangement. At the passive cable network baseband optical node, the digital interactive broadband signals are modulated and injected into the coaxial distribution in the same 750 MHz and 1 GHz carriers. The switched digital video signals may be delivered to the subscriber in the MPEG format, thus maintaining the same settop requirement for both transport options. Alternately, the digital video signals may be delivered to the subscriber in direct ATM signal along with other ATM-based service options.

In many cluster applications, the short distances from the optical node to the subscribers may necessitate the utilization of existing twisted-pair telephony wires. As an option, the baseband optical node may provide the ability to distribute digital telephony signals over either the coaxial bus or the existing copper pairs.

Figure 11:
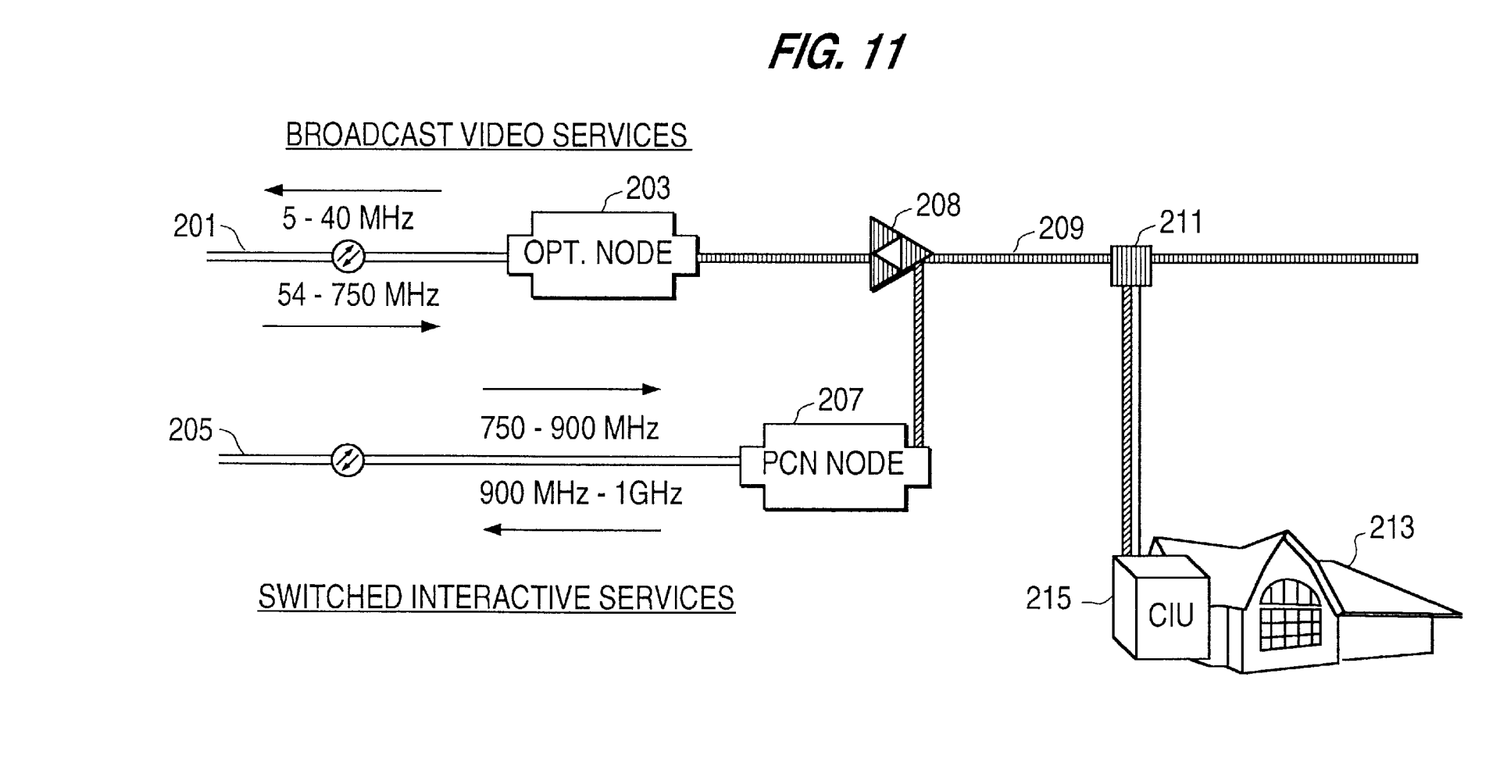
FIG. 11 illustrates an implementation of the present invention.

One implementation of the present invention is shown in FIG. 11. FIG. 11 illustrates a system which may be utilized by cable television operators. Broadcast video services are supplied over a fiber optic link 201 to a fiber optic node 203. The signals transmitted over fiber optic link 201 correspond to a forward path from 54–750 MHz and a return path from 5–40 MHz. A multimedia fiber optic link 205 for switched interactive services is connected to a passive communication network node 207 arranged at tap amplifier 208. The signals transmitted over fiber optic link 205 correspond to a forward path from 750–900 MHz and a return path from 900 MHz to 1 GHz. Passive communication network node 207 is coupled to the coaxial distribution plant 209. A tap 211 taps off signals and supplies the signals to a home 213 via a customer interface unit (CIU) 215. CIU 215 functions to, for example, receive and process downstream signals, transmit in the upstream path, provide a standard two-wire telephone interface, and provide a ringing voltage. Although the CIU of FIG. 11 is shown as being connected to one home, a CIU may be provided for serving a plurality of homes.

Figure 12:
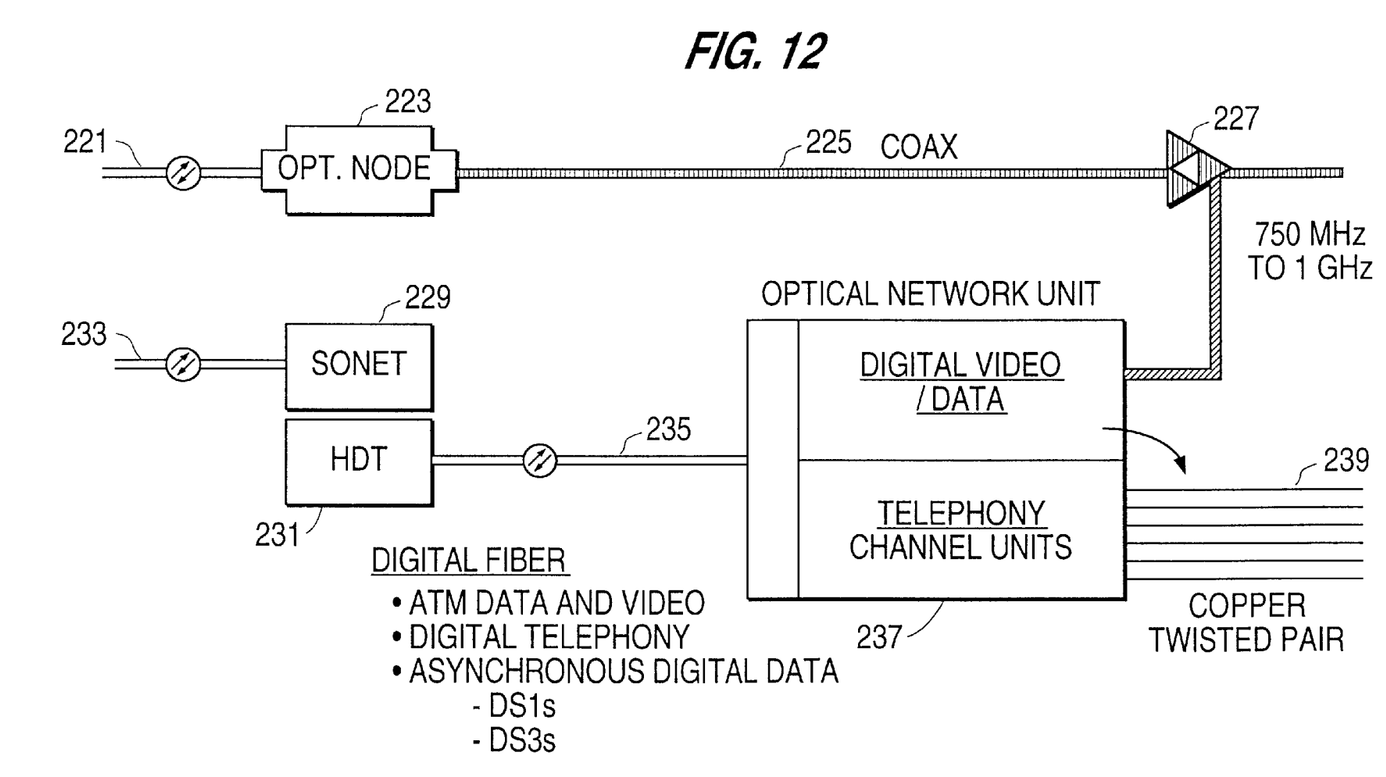
FIG. 12 illustrates a modification of the present invention.

FIG. 12 illustrates a modification of the present invention. A fiber optic link 221 connects a fiber optic node 223 to a headend (not shown). The output of fiber optic node 223 is distributed over a coaxial distribution plant 225 which includes a tap amplifier 227. A SONET interface 229 and a host digital terminal (HDT) 231 are connected to the headend by a fiber optic link 233. HDT 231 is connected via a fiber optic link 235 to an optical network unit 237 located at tap amplifier 227. HDT 231 may also be connected via respective links to optical network units located at other tap amplifiers. Optical network unit 237 interfaces digital video and data to coaxial distribution plant 225 and to copper twisted-pairs telephony lines 239. A telephony interface of optical network unit 237 is also connected to telephony lines 239. HDT 231 functions as a switch router which is responsive to SONET interface 229 for routing signals (e.g., telephone calls) to the appropriate optical network unit and thereby to the appropriate house. The arrangement of FIG. 12 minimizes the number of fibers which must be run back to the headend.

While there has been shown and described various embodiments of the present invention, it will be evident that various modifications may be made thereto without departing from the spirit and scope of the invention which is set forth in the appended claims.

I claim:

1. A communications system, comprising:
   a first communications link for providing signals within a first contiguous bandwidth to a user, including,
      a first fiber optic link including at least one fiber optic cable;
      a coaxial distribution plant including coaxial distribution lines and a plurality of amplifiers, and
      a first fiber optic node for converting optical signals within said first contiguous bandwidth to first electrical signals for coupling into said coaxial distribution plant; and
   a second communications link for providing signals within a second bandwidth to said user, said second contiguous bandwidth separate and distinct from said first contiguous bandwidth and not including any frequencies that are included within said first contiguous bandwidth, and said second communications link including,
      a second fiber optic link including at least one fiber optic cable, and
      a second fiber optic node for converting optical signals within said second contiguous bandwidth to second electrical signals;
   a directional coupler located downstream from one of said amplifiers within said coaxial distribution plant for coupling said second electrical signals into said coaxial distribution plant,
   wherein said first and second contiguous bandwidths are coupled to and transmitted over said coaxial distribution plant in a downstream direction, wherein said one of said amplifiers provides, at its output, the first electrical signals having signal levels defining a first forward tilt, and wherein said second electrical signals are coupled into said coaxial distribution plant at signal levels defining a second forward tilt that is aligned relative to said first forward tilt.

2. The communications system according to claim 1, wherein said first fiber optic link includes a forward path and a reverse path and said first fiber optic node includes an optical receiver for receiving optical signals transmitted over the forward path of said first fiber optic link and an optical transmitter for transmitting optical signals over the reverse path of said first fiber optic link.

3. The communications system according to claim 2, wherein said second fiber optic link includes a forward path and a reverse path and said second fiber optic node includes an optical receiver for receiving optical signals transmitted over the forward path of the second fiber optic link and an optical transmitter for transmitting optical signals over the reverse path of the second fiber optic link.

4. The communications system according to claim 3, wherein said optical receiver of said first fiber optic node converts optical signals received over said first fiber optic link to RF signals in a first frequency range, said optical transmitter of said first fiber optic node converts RF signals in a second frequency range to optical signals for transmission over said first fiber optic link, said optical receiver of said second fiber optic node converts optical signals received over said second fiber optic link to RF signals in a third frequency range, and said optical transmitter of said second fiber optic node converts RF signals in a fourth frequency range to optical signals for transmission over said second fiber optic link.

5. The communications system according to claim 4, wherein the first frequency range is from 54 to 750 megahertz, the second frequency range is from 4 to 50 megahertz, the third frequency range is from 751 to 900 megahertz, and the fourth frequency range is from 901 megahertz to 1 gigahertz.

6. The communications system according to claim 1, wherein said second fiber optic link includes a first optical fiber and said second fiber optic node includes a transmitter for transmitting optical signals over a reverse path of said first optical fiber of said second fiber optic link.

7. The communications system according to claim 6, wherein said second fiber optic node further includes a coupler for coupling signals from said coaxial distribution plant to the transmitter of said second fiber optic node.

8. The communications system according to claim 6, wherein the transmitter of said second fiber optic node transmits amplitude modulated optical signals.

9. The communications system according to claim 6, wherein the transmitter of said second fiber optic node transmits digital optical signals.

10. The communications system according to claim 1, wherein said second fiber optic link includes a first optical fiber and said second fiber optic node includes a receiver for receiving optical signals transmitted over a forward path of said first optical fiber of said second fiber optic link.

11. The communications system according to claim 10, said second fiber optic node further includes a coupler for coupling signals from the receiver of said second fiber optic node to said coaxial distribution plant.

12. The communications system according to claim 10, wherein the receiver of said second fiber optic node receives amplitude modulated optical signals.

13. The communications system according to claim 10, wherein the receiver of said second fiber optic node receives digital optical signals.

14. The communications system according to claim 1, wherein said second fiber optic link includes a first optical fiber and said second fiber optic node includes a receiver for receiving optical signals transmitted over a forward path of the first optical fiber of said second fiber optic link and a transmitter for transmitting optical signals over a reverse path of the first optical fiber of said second fiber optic link.

15. The communications system according to claim 14, wherein said second fiber optic node further includes a coupler for coupling the receiver of said second fiber optic node to said coaxial distribution plant and for coupling said coaxial distribution plant to the transmitter of said second fiber optic node.

16. The communications system according to claim 14, wherein the receiver of said second fiber optic node receives amplitude modulated optical signals and the transmitter of said second fiber optic node transmits amplitude modulated optical signals.

17. The communications system according to claim 14, wherein the receiver of said second fiber optic node receives digital optical signals and the transmitter of said second fiber optic node transmits digital optical signals.

18. The communications system according to claim 1, wherein said second fiber optic link includes first and second optical fibers and said second fiber optic node includes a first receiver for receiving optical signals transmitted over a forward path of said first optical fiber and a second receiver for receiving optical signals transmitted over a forward path of said second optical fiber.

19. The communications system according to claim 1, wherein said amplifiers are diplex filter amplifiers for amplifying signals transmitted over a forward and a reverse path of said coaxial distribution plant.

20. The communications system according to claim 1, wherein said second fiber optic node is coupled to an output of said one amplifier of said coaxial distribution plant.

21. A communications system having a forward path for transmitting signals to a user, the communications system comprising:
   a first communications link for providing, in the forward path, signals having frequencies within a first contiguous bandwidth, including,
      a first fiber optic distribution system for transmitting first optical signals within said first contiguous bandwidth,
      first conversion means for converting said first optical signals into first electrical signals within said first contiguous bandwidth, and
      a coaxial distribution plant coupled to said first conversion means for transmitting said first electrical signals, and
   a second communications link for providing, in the forward path, signals having frequencies within a second contiguous bandwidth, said second contiguous bandwidth separate and distinct from said first contiguous bandwidth and not included within said first contiguous bandwidth, and said second communications link including,
      a second fiber optic distribution system for transmitting second optical signals within said second contiguous bandwidth,
      second conversion means for converting said second optical signals to second electrical signals within said second contiguous bandwidth, and
   a directional coupler for coupling said second electrical signals into said coaxial distribution plant, wherein, at said directional coupler, said first electrical signals have signal levels defining a first forward tilt and said second electrical signals have signal levels defining a second forward tilt that is aligned relative to said first forward tilt.

22. The communications system according to claim 21, wherein said directional coupler is located downstream from an amplifier of said coaxial distribution plant.

23. A communications system having forward and reverse paths, comprising:
   a first communications link for providing signals having frequencies within a first contiguous bandwidth in the forward path and for providing signals having frequencies within a second contiguous bandwidth in the reverse path, said first communications link including,
      a first fiber optic node connected to a first optical fiber for converting first optical signals received over said first optical fiber to first electrical signals in the forward path, and
      a coaxial distribution plant including coaxial distribution lines and a plurality of amplifiers for distributing the first electrical signals in the forward path; and
   a second communications link for providing signals having frequencies within a third contiguous bandwidth in the forward path and for providing signals having frequencies within a fourth contiguous bandwidth in the reverse path, said second communications link including,
      a second fiber optic node connected to a second optical fiber for converting second optical signals received over said second optical fiber to second electrical signals in the forward path, and
      coupling means for coupling the second electrical signals into said coaxial distribution plant for transmission thereover in the forward path, wherein, at said coupling means, said first electrical signals have signal levels defining a first forward tilt and said second electrical signals have signal levels defining a second forward tilt that is aligned relative to said first forward tilt.

24. The communications system of claim 23, wherein said first, second, third, and fourth contiguous bandwidths are each separate and distinct from the others, and wherein each includes frequencies that are not included in any other of said first, second, third, and fourth contiguous bandwidths.

25. The communications system of claim 24, wherein:
   said first contiguous bandwidth comprises frequencies between 54 and 750 megahertz;
   said second contiguous bandwidth comprises frequencies between 5 and 40 megahertz;
   said third contiguous bandwidth comprises frequencies between 750 and 900 megahertz; and
   said fourth contiguous bandwidth comprises frequencies between 900 megahertz and 1 gigahertz.

* * * * *

UNITED STATES PATENT AND TRADEMARK OFFICE
CERTIFICATE OF CORRECTION

PATENT NO : 6,161,011
DATED : DECEMBER 12, 2000
INVENTOR(S) : LOVELESS

It is certified that error appears in the above-identified patent and that said Letters Patent is hereby corrected as shown below:

Column 3, Line 22, delete "(FTRC")", and insert therefore --(FTTC)--
Column 6, Line 61, delete "forwards" and insert therefore --forward--

Signed and Sealed this

First Day of May, 2001

Attest:

NICHOLAS P. GODICI

*Attesting Officer*   *Acting Director of the United States Patent and Trademark Office*